June 13, 1972  R. G. WHEELER  3,669,783
METHOD OF FORMING A PANEL WITH A ROUGH
TEXTURED, PRINTED SURFACE
Filed Nov. 13, 1969

ROBERT G. WHEELER
INVENTOR

BY
BUCKHORN, BLORE, KLARQUIST & SPARKMAN
ATTORNEYS

United States Patent Office 3,669,783
Patented June 13, 1972

3,669,783
METHOD OF FORMING A PANEL WITH A ROUGH TEXTURED, PRINTED SURFACE
Robert G. Wheeler, Corvallis, Oreg., assignor to Wood Processes, Oregon Ltd., Corvallis, Oreg.
Filed Nov. 13, 1969, Ser. No. 876,486
Int. Cl. B32b 33/00
U.S. Cl. 156—90
12 Claims

ABSTRACT OF THE DISCLOSURE

A preformed panel is provided with a textured, printed surface by first adhering a spongy compressible fiber web, having a substantially uniform thickness and a high moisture content, to a surface of said panel. A decorative pattern sheet is then secured over the web, and the resultant assembly is compressed by means of a textured metal surface caul plate having its textured surface disposed adjacent the decorative pattern sheet. The assembly is maintained under heat and pressure conditions for a sufficient time for substantially drying the web and producing bonding of the assembly, which retains the impression of the caul plate.

BACKGROUND OF THE INVENTION

Low quality wood panels or other panel surfaces are sometimes covered with a decorative paper which is printed to simulate a higher grade wood surface or the like. The resultant panel may tend to have an unreal or imitation appearance, especially in the case of wall paneling. The appearance would be improved by providing a textured or relief surface lending a three-dimensional effect to the panel surface.

While embossed surface have heretofore been impressed upon artificial boards during their manufacture, such processes are generally not applicable to the treatment of surfaces of panels already formed. Furthermore, although preformed panels have occasionally been provided with a striated surface produced by a multiplicity of grooves smoothly cut or machined into the face thereof, an extensive or overall textured pattern is not provided thereby.

SUMMARY OF THE INVENTION

In accordance with the present invention, a preformed panel is overlaid with a spongy compressible web of cellulosic fibers having a moisture content of about fifty to eighty percent of the wet weight thereof and a substantially uniform thickness in excess of about fifty thousandths of an inch. This web is adhered to the preformed, generally low grade, panel by means of an adhesive coated on the panel or the web, or by employing an interleaved paper glue line therebetween. Over the spongy web is disposed a decorative pattern sheet adhered to the web in a similar manner, the pattern sheet having a thickness less than the thickness of the web and generally being formed of printed paper. The resultant assembly is compacted, for example in a hot press, employing a textured metal surface caul plate or embossing plate disposed with its rough side against the decorative pattern sheet. Heat and pressure conditions are maintained for a sufficient time substantially to dry the web and produce bonding of the adhesive material, during which time the pattern sheet, backed by the web, will take on and retain the irregular impression of the caul plate.

It is accordingly an object of the present invention to provide an improved method for upgrading or reclaiming low grade wooden panels and the like.

It is a further object of the present invention to provide an improved method of forming a panel with a rough, textured, printed surface.

It is a further object of the present invention to provide an improved method for economically forming decorative, textured panels which may be employed for wall paneling.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
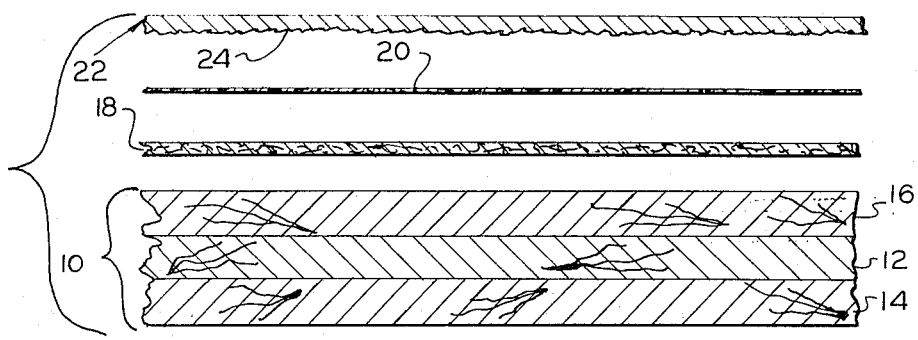
FIG. 1 is a partially broken-away, side view of an assembly of elements for forming a textured panel according to a method of the present invention.

According to the present invention, inferior grade or low quality, preformed wooden panels and the like may be reclaimed or upgraded so that the same may be used for decorative wall paneling and other similar purposes. Amongst the materials which may be upgraded in this manner are wooden panels, plywood panels, particle board, hard board, soft board, or medium density board panels. In FIG. 1, illustrating an exploded assembly of elements employed according to a first embodiment of the present invention, a cross section of a preformed relatively low grade plywood panel 10 may comprise three plies including a core 12, and two outer sheets 14 and 16 with adhesive disposed between the outer sheets and the core. This plywood panel 10 may have surface imperfections or irregularities (not shown) rendering it unusable for providing a finished surface.

According to the method of the present invention, the preformed panel 10 is overlaid with a spongy, compressible web 18 of interlaced cellulosic fibers having a high moisture content as compared with the preformed panel. This web desirably has a uniform thickness, between fifty and sixty thousandths of an inch. Such a web may be formed from any suitable raw material of a cellulosic nature such as wood, straw, ramie, and others utilized to make paper or pulp products. For reasons of economy, the fibers are preferably provided by reclaiming paper such as ledger paper, bond paper, newspaper, magazines, or mixtures of the same. In preparing the web, a slurry is provided of the proper consistency for suction formation, such as about three-quarters of one percent of fibers by weight to the weight of water employed. The web may be formed on a suction cylinder disposed in such a slurry of fibers as described, for example, in Pat. No. 3,028,293 granted to Ralph Chapman. The production of the web is adjusted so that the moisture content after suction formation is between about fifty and eighty percent, based on the wet weight thereof, and preferably about sixty percent. A high moisture content is desirable so that the spongy web is easily compressible, and also so that steam will be formed under high temperature conditions, subsequently provided, for bonding together the elements of the finished product.

According to a first embodiment of the present invention, the web thus formed is coated with adhesive on each side thereof before placing the same upon panel 10. The adhesive may be a protein adhesive, but commercially available artificial thermosetting resins are preferred such as phenolic resins, melamine resins, etc. According to the first embodiment, the adhesive in liquified condition is spread or coated onto web 18, and may then be surface dried with an infra-red heat source to eliminate surface tackiness and reduce resin flow, but without sufficient heat to advance the resin. This not only allows for handling of sheets in lay up but, in the case of liquid phenolic resins, produces an effective bond to the web. In the event the web is immediately applied to the panel in a continuous manner from a roller or the like after receiving the adhesive, this partial drying may not be necessary. A portion of the adhesive will be absorbed into web 18.

After placement of the web upon panel 10, the web is overlaid with a decorative pattern sheet 20 suitably formed of paper having a decorative pattern printed thereon, e.g. a printed pattern simulating high-grade wood paneling. Of course, the non-printed side is disposed next to the web so that the decorative pattern is exposed. Normally, the printed pattern sheet is much thinner than web 18 whereby the pattern sheet 20 may be pressed into the compressible web, as hereinafter described. A smooth surfaced pattern sheet is generally employed. However, creped paper may be substituted, and in certain instances allows the impression of a deeper pattern.

Figure 4:
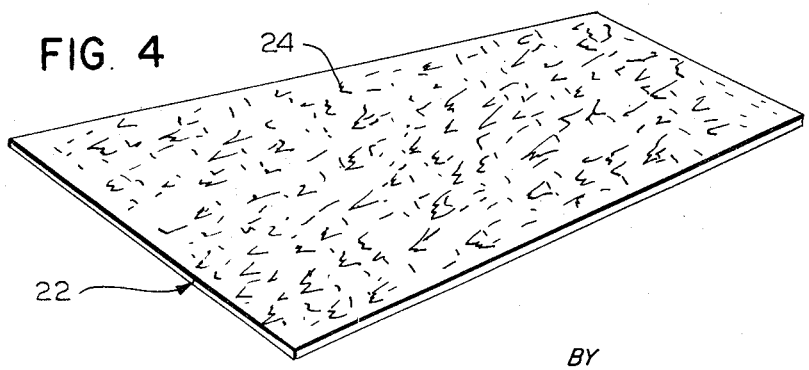
FIG. 4 is a perspective view of a metal caul plate employed according to the present invention.

The assembly, comprising panel 10, web 18, and pattern sheet 20, is compacted together by compressing the assembly with a textured embossing plate or caul plate 22, suitably formed of a metal such as mild steel or aluminum. This caul plate typically has a thickness of approximately one-quarter inch, and is provided with rough a jagged surface irregularities, or another suitable pattern, on side 24 thereof oriented toward pattern sheet 20. The pattern is substantially overall or continuous, and is substantially duplicated upon the surface of the panel according to the present invention. One type of caul plate, illustrated in FIG. 4, is formed of steel having a surface 24 which has been textured by rough machining in a planer mill. A dulled planer tool was employed for removing metal on surface 24 to a depth of from approximately .020 to .050 inch with a rough, tearing action. A layer of metal was more or less scraped or torn from the surface of the plate, leaving the rough, jagged, and textured surface at 24. The pattern of the surface consists of alternating ridges and fissures which are of random width and depth, and thus irregular in all directions. A pattern of this type is illustrated and claimed in my Design Pat. No. D. 213,493, issued Mar. 11, 1969, entitled "Decorative Surface for a Panel," and assigned to the assignee of the present invention. The process of making the caul plate is further set forth and claimed in my Pat. No. 3,474,706, issued Oct. 28, 1969, entitled "Process for Making a Textured Surface Panel," and assigned to the assignee of the present invention.

The caul plate surface configuration is impressed upon the surface of pattern sheet 20 backed by soft web 18. The pattern sheet 20 takes on a full impression of the caul plate irregularities, with the web being compressed to a greater or lesser extent in accordance with the surface of the caul plate. The web 18 is the compressible element with sheet 20 usually not changing greatly in elemental thickness. A deeper impression is possible in the case of a creped paper pattern sheet.

Figure 2:
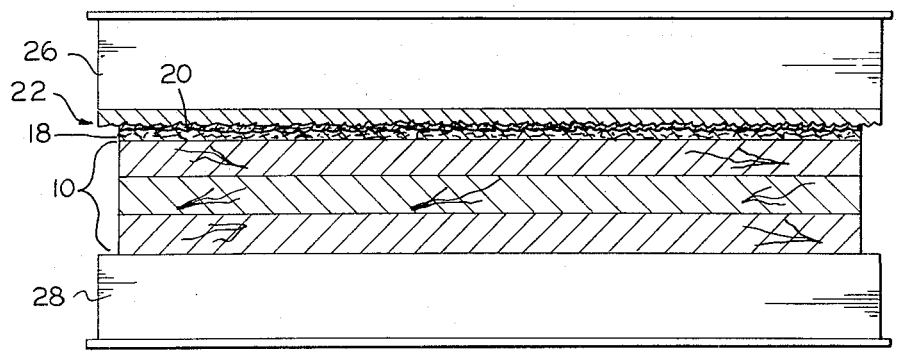
FIG. 2 is a side view of the same elements compacted together in a hot press.

FIG. 2 illustrates compression of caul plate 22 against the assembly of panel 10, web 18, and pattern sheet 20. The assembly and caul plate 22 are here disposed between parallel platens 26 and 28 of a hot press, with caul plate 22 attached to upper platen 26 by means not shown. The platens are hollow and are suitably provided with a hot gas, such as hot air or steam, for heating the assembly to an elevated temperature. The temperature should be higher than the boiling point of water whereby steam will form from the moisture in web 18, but below the charring point of paper in order that neither pattern sheet 20 nor web 18 will become charred. The temperature is desirably between 275 F. and 325° F.

Although caul plate 22 is here illustrated as attached to the upper caul plate, in certain instances it is desirable to place 22 on the lower platen. In that event, of course, the assembly is disposed in reverse order with pattern sheet 20 still next to the textured caul plate. Alternatively, a pattern sheet and web may be disposed on each side of panel 10, and textured caul plates employed both above and below the assembly.

A pressure is applied between the press platens of from between 30 p.s.i. and several hundred p.s.i. for a period of time producing substantial drying of web 18 and bonding of the assembly. All but one or two percent of the water in web 18 is desirably driven out, and the fibers thereof are set in a compacted condition, as illustrated in FIG. 2, wherein it can be seen web 18 is somewhat compacted from its original thickness.

In the event the glue or adhesive on and in web 18 is dried prior to the compression, the steam formed at the elevated temperature will liquify the adhesive, and then, as the steam is driven out, the adhesive in and on the web becomes set at the elevated temperature employed. The fibers of web 18 become set in their compacted condition into a solidified product which will retain its form. The pattern from the caul plate is thus imparted to the pattern sheet 20 and to web 18, with web 18 simultaneously hardening into this pattern and becoming consolidated as an integral part of the panel along with pattern sheet 20.

The press comprising platens 26 and 28 may comprise any standard hot press, e.g., a conventional multiple opening platen press may be used. More advantageously, a stack press is utilized as set forth and claimed in Pat. No. 3,061,878, granted to Ralph Chapman on Nov. 6, 1962, entitled "Press Apparatus for Forming Composite Boards," and assigned to the assignee of the present invention. Employing a press of this type, the panels formed according to the present invention may be retained under pressure in a stacked array of platens for a period between fifteen minutes and two hours, depending upon the temperatures and pressures employed. After removal of the textured panel from the press, it will retain an overall textured surface form and the panel will thus have the same appearance as is illustrated in FIG. 4 for the caul plate, in addition to the pattern printing.

According to an alternative embodiment, instead of spreading glue or adhesive on both sides of web 18 prior to placement of the web in the assembly, one layer of adhesive may be first applied on top of panel 10, after which the web 18 is superimposed thereupon. Then, another coating of adhesive may be applied on the exposed surface of web 18 prior to the placement of pattern sheet 20 thereupon. Alternatively, adhesive is applied between web 18 and panel 10, to either one of these elements, and a commercially available pattern sheet is employed having a dry glue film on its underside. The glue will become liquified under heat and pressure conditions as steam is later generated from web 18.

Figure 3:
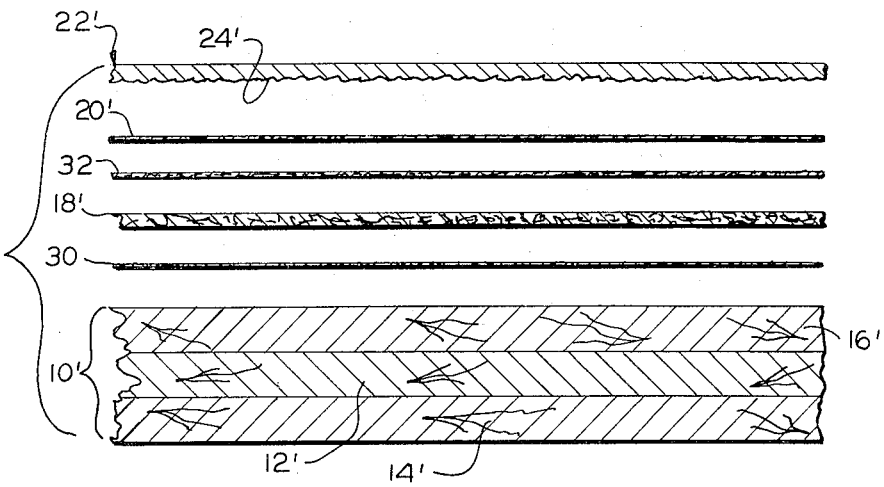
FIG. 3 is a partially broken-away, side view of an assembly of elements for forming a textured panel in accordance with an alternative embodiment of the present invention.

Referring to FIG. 3, the elements of a product formed according to another embodiment of the present invention are illustrated in exploded fashion, with primed reference numerals designating similarly numbered elements of FIGS. 1 and 2. In this embodiment, instead of applying glue or adhesive directly to the preformed panel, web, or pattern sheet, adhesive is interposed by means of a first paper phenolic glue line 30 and a second paper phenolic glue line 32. In laying up the elements of the FIG. 3 assembly, glue line 30 is interposed between panel 10' and web 18' while glue line 32 is located between web 18' and pattern sheet 20'. Otherwise, the process is the same as hereinbefore described. The adhesive in the glue lines becomes liquified under heat and pressure conditions applied to the assembly, and permeates web 18.

While I have shown and described preferred embodiments of my invention, it will be apparent to those skilled in the art that many changes and modifications may be made without departing from my invention in its broader aspects.

I claim:

1. The method of providing a textured, printed surface on a preformed panel comprising:
adhering a spongy fiber web having a high moisture content as compared with said panel upon a surface of said panel,
adhering a printed pattern sheet over said web,
compressing said pattern sheet with a textured caul plate having surface irregularities pressed against said pattern sheet to provide an impression of said caul plate upon said pattern sheet as backed by said web,
and withdrawing moisture from said web causing said pattern sheet as backed by said web to retain the impression of the surface irregularities of said caul plate.

2. The method of making a textured printed surface panel from a preformed panel comprising:
overlaying a spongy web of cellulosic fibers upon a surface of said preformed panel, with an adhesive material applied therebetween for adhering said web to said preformed panel, said spongy web having a moisture content of at least about fifty percent based upon wet weight and a substantially uniform thickness in excess of about fifty thousandths of an inch,
superimposing a decorative printed pattern sheet upon the exposed surface of said web employing adhesive material therebetween for adhering said pattern sheet to said web,
compacting the assembly comprising the pattern sheet, web, and preformed panel under heat and pressure conditions by means of a textured surface metal caul plate having surface irregularities, said caul plate being compressed against said pattern sheet to provide an impression of said caul plate surface upon said pattern sheet as backed by said web, said web becoming compressed according to said irregularities, and maintaining said heat and pressure conditions for a sufficient time for substantially drying said compressed web and bonding said assembly together with said adhesive material.

3. The method according to claim 2 wherein said fiber web is coated on both sides thereof with a said adhesive material prior to the overlying of said web upon said preformed panel.

4. The method according to claim 2 wherein said preformed panel is coated with a said adhesive material prior to overlaying of said fiber web thereupon, after which the exposed surface of said fiber web is coated with a said adhesive material before superposition of said decorative pattern sheet thereupon.

5. The method according to claim 2 wherein said adhesive material is provided by means of an initially dry, glue line paper interleaved between said preformed panel and said web, as well as between said web and said pattern sheet, before the compaction of said assembly.

6. The method according to claim 2 wherein the adhesive material disposed between said web and said pattern sheet comprises a dry glue film initially provided on the underside of said pattern sheet.

7. The method according to claim 2 wherein the moisture content of said web is approximately sixty percent of the total wet weight of said web.

8. The method according to claim 2 wherein said cellulosic fibers are selected from wood, straw, ramie, or reclaimed paper fibers, or mixtures of the same.

9. The method according to claim 2 wherein said preformed panel comprises low grade wood paneling, plywood, particle board, hard board, soft board, or medium density board.

10. The method according to claim 2 wherein said assembly is raised to a temperature above the boiling point of water, but below the charring point of paper.

11. The method according to claim 2 wherein said assembly is compacted in a press between hollow parallel platens with said caul plate secured to one of said platens, and including supplying heated gas to the interior of said platens for raising the temperature of said assembly.

12. The method of making a textured printed surface panel from a preformed panel comprising:
forming a spongy web of interlaced cellulosic fibers having a moisture content of approximately sixty percent based on wet fiber weight, and a substantially uniform thickness in the range of about fifty to sixty thousandths of an inch,
overlaying said fibers web upon a surface of a said preformed panel with an adhesive material applied therebetween for adhering said fiber web to said preformed panel,
superimposing a printed paper pattern sheet having a thickness less than the thickness of said web upon the exposed surface of said web with an adhesive material therebetween for adhering said pattern sheet to said web,
compacting the assembly, comprising the superimposed pattern sheet, web, and preformed panel, with a rough, textured, metal caul plate having its rough surface disposed toward said pattern sheet between the platens of a hot press,
and applying pressure between the platens of said press on the order of from 30 p.s.i. to several hundred p.s.i. while supplying heat to said platens for raising the temperature of said assembly to the range between 275° F. and 325° F. for a sufficient time substantially to dry said web in a compressed condition for providing a surface texture on said pattern sheet corresponding to the rough surface of said caul plate and for bonding said assembly together.

References Cited
UNITED STATES PATENTS

| | | | |
|---|---|---|---|
| 2,245,169 | 6/1941 | Von Ende et al. | 156—581 X |
| 2,343,740 | 3/1944 | Birmingham | 161—56 |
| 2,456,006 | 12/1948 | Hickler | 156—90 |
| 3,247,047 | 4/1966 | Buckley | 161—123 |
| 3,384,137 | 5/1968 | Ash | 156—497 X |

BENJAMIN A. BORCHELT, Primary Examiner

D. BENT, Assistant Examiner

U.S. Cl. X.R.

144—327, 328